UNITED STATES PATENT OFFICE.

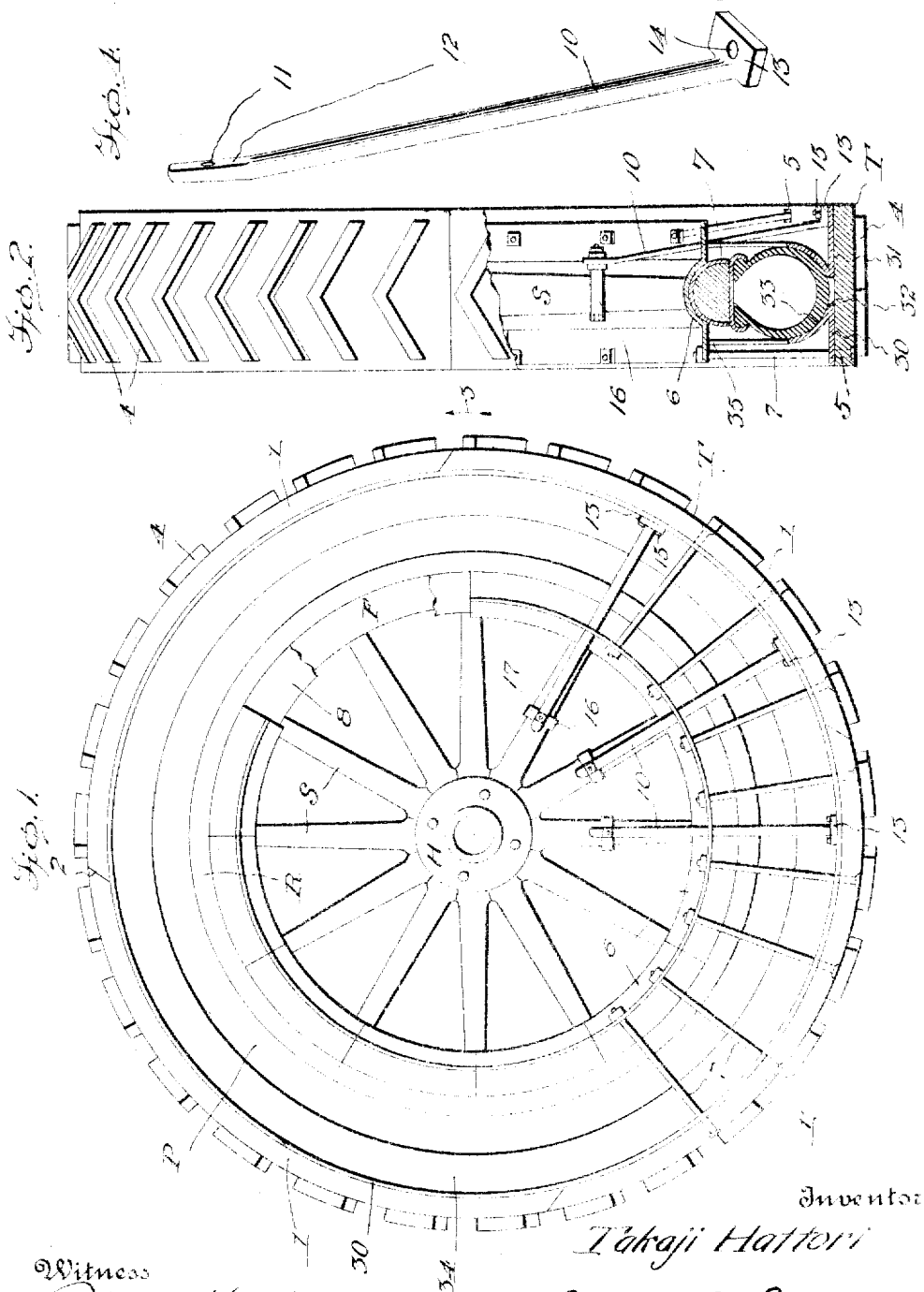

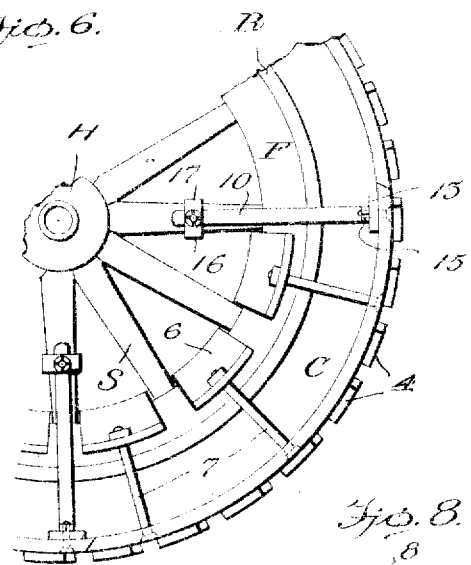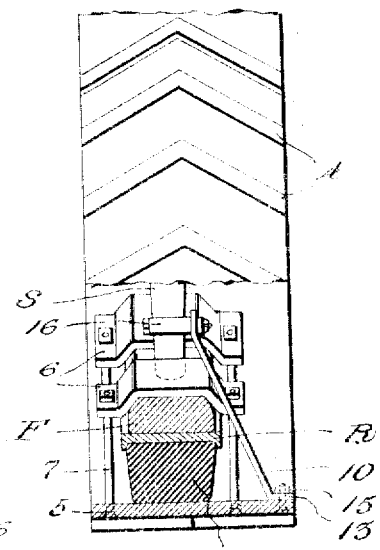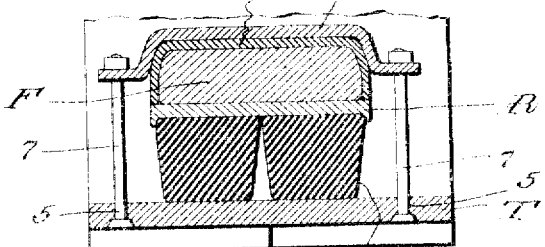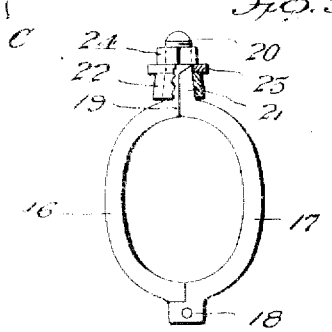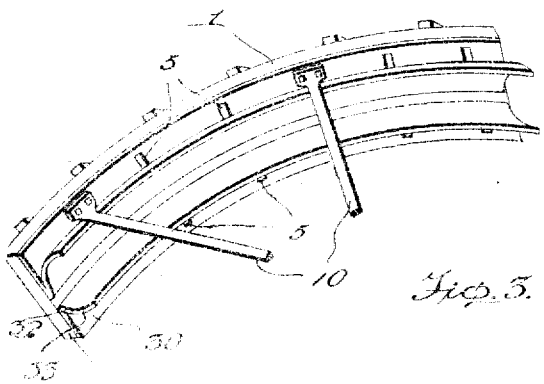

TAKAJI HATTORI, OF FELLOWS, CALIFORNIA.

TRACTION-TIRE.

1,267,219.  Specification of Letters Patent.  Patented May 21, 1918.

Application filed November 3, 1917. Serial No. 200,216.

*To all whom it may concern:*

Be it known that I, TAKAJI HATTORI, a subject of the Emperor of Japan, residing at Fellows, in the county of Kern and State of California, have invented new and useful Improvements in Traction-Tires, of which the following is a specification.

This invention relates to traction wheels, and more especially to detachable traction tires; and the object of the same is to produce a tire of this class which may be applied to the soft tire of an automobile wheel, whether the last named tire is of the pneumatic or cushion type, without taking such soft tire off the wheel or changing the construction of parts.

This object is accomplished by attaching the traction tire to the automobile tire by means of clips and bolts which hold it from radial movement outward, and by extension spokes which hold it from radial movement inward. If the soft tire be of the pneumatic type, a two-part saddle is interposed between it and the traction tire, whereas the saddle may be omitted if the soft tire is of the cushion type. Two types of my invention are illustrated in the accompanying drawings wherein:—

Figure 1 is a side elevation and Fig. 2 a transverse section of a wheel equipped with this tire and partly broken away.

Fig. 3 is a perspective detail of one of the tire sectors, taken somewhat from the inside.

Fig. 4 is a perspective detail of one of the extension spokes on a rather larger scale, and Fig. 5 is a detail of the spoke grips and its parts.

Fig. 6 is a side elevation partly in section, and Fig. 7 a transverse section of a wheel having a cushion tire, the same being equipped with this invention; and Fig. 8 is a cross-sectional detail on a larger scale.

The wheel may be briefly described as composed of a hub H from which radiate spokes S connected at their outer ends to a felly F, and around the same is a rim R which in the first type of my invention carries a pneumatic tire P, while in the second type of my invention it carries a solid or cushion tire C—either being referred to herein as the soft tire. Let us assume that it is desired to apply a traction tread or tire to a wheel of this kind without interfering with the soft tire.

The traction tire T is made in sectors 1, usually about four to the circle, and their meeting ends 2 are beveled or undercut on complementary inclines as seen in Fig. 1, so that when the wheel rotates in the direction of the arrow 3 mud and dirt will not get between the ends. The face of the tire may be provided with ribs 4 of any approved shape to give it proper traction or cling upon the roadway or soft earth. The tire should be considerably broader than the soft tire which it is designed to cover, and its body at intervals is provided with parallel slots 5 near its edge. Over the felly between the spokes are placed wear plates 8 and across these plates are passed the upbent centers of clip plates 6 having holes near their outer ends. Bolts 7 are now passed inward through the slots 5 and the holes in the clip plates and nuts applied to their inner ends and tightened. This structure is shown in both Figs. 2 and 8, and comprises the means for holding the tire T inward toward the soft tire. Extension spokes 10 (see Fig. 4) are employed, one for each wheel spoke S. The upper portion of each extension is pierced with an eye 11 below which it is outbent as at 12, and its lower portion is turned outward into a foot 13 pierced with a hole 14 through which passes a bolt 15 which also extends through the tire T and preferably has its head at the outside of the latter. In Fig. 5 is shown a spoke grip, whereof two are used for each extension. The wheel spoke S will be wrapped with tire tape or other cushion to prevent it becoming scratched and this spoke grip applied. It is made up of two members 16 and 17 hingedly connected at one side as at 18, one member having a recess 19 at the other side and a threaded stud 20 projecting beyond its recess, and the other member having a lip 21 fitting in said recess as shown. A collar 22 is next slipped past the stud 20 and embraces the lip and the contiguous part of the other member to hold the two members assembled, then the stud is passed through the eye 11 in the extension 10, and eventually a washer 23 and a nut 24 are applied to the outer end of the stud to clamp the extension to the spoke. Each wheel spoke carries one of these spoke grips near the felly and it holds the extension very rigidly thereto so that its radially outer portion may be attached at a proper point to the tire T. Substantially the same type of extension is shown in Figs. 6 and 7, The types of my invention differ, however, to the extent that when a pneumatic tire P is employed, there must be a saddle interposed between it and the steel tire T. This saddle is made in two members, perhaps best seen in Figs. 2 and 3, and each member is made in sectors perhaps, although not necessarily, equal in number with the sectors of the tire T, and is applied at one side of the soft tire before the spoke extensions are put on and, in fact, before the steel tire T is put on. Each section is of light sheet metal, and of course has the proper curvature to conform with the size of the tire P. It comprises a flat tread 30 whereof one edge 31 is coincident with the edge of the steel tire T, and at its other edge it is bent as at 32 in an acute angle and carried inward and upward in what I will call a trough 33 which conforms with about one-quarter of the transverse curvature of the soft tire. The member at the inner side of the wheel has a somewhat narrower tread than that at the outer side, as best seen in Fig. 2, and the result is that the soft tire does not stand exactly over the transverse center of the steel tire. This I do purposely because on some automobiles and motor vehicles the wheel runs so close to the framework on the inside that if a rather wide tractor tire were applied centrally to the soft tire, it would strike some part of the structure at the inside of each wheel. Again, I prefer that there be space at the outside of the soft tire to fasten the feet 13 of the extensions to the outer edge of the steel tire. The bolts 15 which effect this fastening pass through holes in the tread of the saddle, and tie or clip bolts 7 above-described also pass through the members of the saddle and hold them in place. When now their nuts are tightened up, the threads of the two members of the saddle are held in strict alinement because they are riveted upon the inner face of the steel tire T. This saddle is not needed in the construction shown in detail in Fig. 8, and in Fig. 7 I have omitted the wear plate 8 which is usually passed over inside of the felly F between the spokes. The purpose of the wear plate is to protect the paint and the wood, but these fellies are sometimes made of metal. Yet it will be obvious that certain forms of cushion tires might call for the use of the saddle, or in other words the saddle might be advantageously employed with cushion tires which are substantially the same size and shape as the pneumatic tires. I would not therefore be limited in this respect.

What I claim as new is:

1. In a traction tire for attachment to the wheel and soft tire of a motor-vehicle, the combination with a steel tread made in sectors and having slots near its side edges, the ends of the sectors being beveled on meeting lines; of wear plates passing over the felly between the spokes, clip plates whose centers overlie said wear plates and whose ends have eyes, and bolts passing through the slots in the tread and through said eye and receiving nuts inside the ends of the clip plates.

2. In a traction tire for attachment to the wheel and soft tire of a motor-vehicle, the combination with a steel tread made in sectors and having slots near its side edges, the ends of the sectors being beveled on meeting lines; of wear plates passing over the felly between the spokes, clip plates whose centers overlie said wear plates and whose ends have eyes, and bolts passing through the slots in the tread and through said eyes and receiving nuts inside the ends of the clip plates; and an extension spoke whose inner end is attached to each wheel-spoke and whose outer end has a foot bolted to said tread near its outer edge.

3. The herein described means for attaching a steel tread to a motor-vehicle wheel having a soft tire, the same comprising clip plates passing over the felly between the spokes, tie bolts connecting the ends of the clip plates with said steel tread for preventing the movement of the latter radially outward; extension spokes having feet at their outer ends bolted to said tread and their inner ends lying along the wheel spokes, and spoke grips embracing the latter and having studs passing through said extension spokes for preventing the tread from moving radially inward on the wheel.

4. In a device for attaching a steel tread to the soft tire of an automobile wheel, the combination with clip plates overlying the felly and connected with the edges of said tread for preventing the latter from moving radially outward, and extension spokes connected with the wheel spokes and having their outer ends connected with said tread for preventing the latter from moving radially inward; of a two part saddle whereof each part has a tread underlying said steel tread and a trough lying against the soft tire.

In testimony whereof I, affix my signature.

TAKAJI HATTORI.